(12) United States Patent
Kokkala et al.

(10) Patent No.: US 12,441,581 B2
(45) Date of Patent: Oct. 14, 2025

(54) CONTROL DEVICE FOR PASSENGER TRAFFIC SYSTEM

(71) Applicant: KONE Corporation, Helsinki (FI)

(72) Inventors: Juho Kokkala, Helsinki (FI);
Marja-Liisa Siikonen, Helsinki (FI);
Juha-Matti Kuusinen, Helsinki (FI);
Henri Hakonen, Helsinki (FI); Mirko Ruokokoski, Helsinki (FI); Jari Karhu, Helsinki (FI); Markus Hautakorpi, Helsinki (FI)

(73) Assignee: KONE Corporation, Helsinki (FI)

( * ) Notice: Subject to any disclaimer, the term of this patent is extended or adjusted under 35 U.S.C. 154(b) by 1200 days.

(21) Appl. No.: 17/306,336

(22) Filed: May 3, 2021

(65) Prior Publication Data

US 2021/0253394 A1 Aug. 19, 2021

Related U.S. Application Data

(63) Continuation of application No. PCT/FI2018/050939, filed on Dec. 18, 2018.

(51) Int. Cl.
*B66B 1/34* (2006.01)
*B66B 5/00* (2006.01)
(Continued)

(52) U.S. Cl.
CPC .......... *B66B 1/3407* (2013.01); *B66B 1/3461* (2013.01); *B66B 5/0012* (2013.01);
(Continued)

(58) Field of Classification Search
CPC ....... B66B 1/34; B66B 1/3461; B66B 5/0012; B66B 5/0025; B66B 5/0037; B66B 2201/403; G05B 13/042
See application file for complete search history.

(56) References Cited

U.S. PATENT DOCUMENTS 5,283,399 A * 2/1994 Fujino ................... B66B 1/2458
187/382
2018/0111793 A1* 4/2018 Miyajima ............. B66B 5/0018

FOREIGN PATENT DOCUMENTS

WO WO 2012/042095 A1 4/2012

OTHER PUBLICATIONS

Yamazaki et al. (JP H08192965 A) Failure Judging Device of Elevator (Year: 1996).*
(Continued)

*Primary Examiner* — Jorge L Carrasquillo
(74) *Attorney, Agent, or Firm* — Birch, Stewart, Kolasch & Birch, LLP (57) ABSTRACT

According to an aspect, there is provided a control device. The control device is configured to receive data from a passenger traffic system configured in a building, the data comprising information associated with operations for transferring passengers of the passenger traffic system; based on the received data, monitor a change in a quality of service level of the passenger traffic system in transferring the passengers and a change in a passenger traffic pattern in transferring the passengers in the passenger traffic system; and in response to detecting the change in the service level or in the passenger traffic pattern, run one or more simulations of the passenger traffic in the passenger traffic system in the at least one building using the received data in order to trigger at least one operation to change a configuration of the passenger traffic system.

18 Claims, 3 Drawing Sheets

(51) Int. Cl.
*B66B 13/04* (2006.01)
*B66B 19/00* (2006.01)
*G05B 13/04* (2006.01)

(52) U.S. Cl.
CPC .......... *B66B 5/0025* (2013.01); *B66B 5/0037* (2013.01); *B66B 19/007* (2013.01); *G05B 13/042* (2013.01); *B66B 2201/403* (2013.01)

(56) References Cited

OTHER PUBLICATIONS

Li (CN 106006248 B) A Based on Remote Monitoring of Elevator Group Control System and Method (Year: 2018).*
Satosaki et al. (CN 102556781 A) An Elevator Group Managing Device (Year: 2012).*
De Jong (WO 2012042095 A1) Elevator System (Year: 2012).*

* cited by examiner

CONTROL DEVICE FOR PASSENGER TRAFFIC SYSTEM

CROSS REFERENCE TO RELATED APPLICATIONS

This application is a Continuation of PCT International Application No. PCT/FI2018/050939, filed on Dec. 18, 2018, which is hereby expressly incorporated by reference into the present application.

TECHNICAL FIELD

The present application relates to the field of passenger traffic system, and more particularly to method and device configured for performance monitoring.

BACKGROUND

Building usage and passenger traffic in the building may change in the course of time. For example when the purpose of the building or services in different floors of the building change. Open offices may drive constant changes in passenger traffic patterns inside the building. A passenger traffic system, which transfers the passengers in the building, may not be able to keep up with the changes in order to provide the most convenient service experience for the passengers.

Typically, configurations of the passenger traffic system may be only changed manually. This takes place after analyzing customer complaints in order to detect and solve the problems occurred in this configuration. Passengers may typically complain that, for example elevators have heavy traffic at a certain point of time. An elevator operation may not detect a need for maintenance of the elevator, until passenger complaints about a possible defect in the elevator service.

Primitive or simple remote control based passenger traffic control systems exists. However, they are typically alerting only about a malfunction of the system. For example, cases where nothing is actually broken or malfunctioning is not at all detected, and still the quality of service of the passenger traffic system may drop to an unacceptable level.

SUMMARY

It is an objective to provide a control device for passenger traffic system. The objective is achieved by the features of the independent claims. Some embodiments are described in the dependent claims.

According to a first aspect, there is provided a control device of a passenger traffic system, configured to receive data from the passenger traffic system configured in at least one building, wherein the data comprises information associated with operations for transferring passengers of the passenger traffic system in the at least one building; based on the received data, monitor a change in a quality of service level of the passenger traffic system in transferring the passengers and a change in a passenger traffic pattern in transferring the passengers in the passenger traffic system; and in response to detecting the change in the service level or in the passenger traffic pattern, run one or more simulations of the passenger traffic in the passenger traffic system in the at least one building using the received data in order to trigger at least one operation to change a configuration of the passenger traffic system. An embodiment may enable automatic detection of deterioration in performance of the passenger traffic system in view of the service level or passenger traffic patterns without requiring a customer complaint triggered process. Further, the embodiment may enable immediate reaction to the occurred problems by triggering the at least one operation to search for an improvement.

In an embodiment, the information associated with the operations for transferring passengers of the passenger traffic system comprises information on at least one of elevator movements, elevator calls, counts of passengers exiting an elevator, counts of passengers entering the elevator, origin-destination counts and observed equipment faults. The embodiment may enable measuring and monitoring the behavior of the passengers and traffic in a building in addition to device-level data.

In an embodiment, in addition or alternatively, the change in the quality of service level comprises at least one of an increase in average waiting times, an increase in peak waiting times, an increase in journey times, changed origin-destination flows and no passengers using one or more sections of the passenger traffic system. The embodiment may enable automatic detection of a deterioration in the service level based on the received data.

In an embodiment, in addition or alternatively, the change in a passenger traffic pattern comprises at least one of a change in origin-destination flows, the amount of traffic, floor populations and floor utilization. The embodiment may enable detecting changes in people traffic and behavior in a building. The embodiment may enable automatic detection of changes in passenger behavior and traffic in the building.

In an embodiment, in addition or alternatively, the one or more simulations of the passenger traffic in the passenger traffic system comprises using at least one adjusted parameter to find an improved parameter setup to change the configuration of the passenger traffic system. The embodiment may enable finding a suitable parameter setup to improve performance of the passenger traffic system based on the simulations.

In an embodiment, in addition or alternatively, the at least one adjusted parameter comprises a change in at least one of parking floors, control parameters, drive parameters, advance door opening, walking speed and a location of the destination operating panel. The embodiment may enable utilizing various parameter changes to find the most suitable parameter setup.

In an embodiment, in addition or alternatively, the control device is further configured to change the configuration of the passenger traffic system by sending a message to the passenger traffic system to change the parameter setup according to the simulation. The embodiment may enable improving the performance of the monitored passenger traffic system automatically.

In an embodiment, in addition or alternatively, the one or more simulations comprises using at least one equipment change to find an equipment upgrade suggestion to change the configuration of the passenger traffic system. The embodiment may enable finding a performance improvement opportunity associated with the equipment even when nothing is broken.

In an embodiment, in addition or alternatively, the at least one operation comprises sending a notification to an administrator of the passenger traffic system, the notification comprising information about at least one of the detected change in the service level or the passenger traffic pattern, the changed parameter setup, a suggestion for changing a current parameter setup or a suggestion to upgrade the equipment. The embodiment may enable timely informing the administrator of the building about changes in the service level as experienced by the passengers and changes in the building traffic. The embodiment may further enable reacting to the detected changes before any customer complaints occur.

In an embodiment, in addition or alternatively, the control device is further configured to receive an acknowledgement from the administrator that an action is performed in response to the received notification; and send a message to the passenger traffic system to cancel changing of the parameter setup. The embodiment may enable providing temporary changes to the configuration of passenger traffic system while a problem is handled manually at site.

In an embodiment, in addition or alternatively, the control device is configured to monitor a change in the service level or the passenger traffic pattern in the passenger traffic system in response to the triggered at least one operation to change the configuration of the passenger traffic system; and compare the monitored change to the earlier detected change to verify an improvement in the service level or in the passenger traffic pattern. The embodiment may enable verifying that the triggered at least one operation to change the configuration of the passenger traffic system has provided an improvement as simulated.

In an embodiment, in addition or alternatively, the at least one operation comprises providing the detected change as an additional input for predictive maintenance. The embodiment may enable predictive maintenance with an improved fault detection.

In an embodiment, in addition or alternatively, the control device is further configured to receive data from a plurality of passenger traffic systems configured in different buildings; compare detected changes in the quality of service level and passenger traffic patterns of passenger traffic systems in similar buildings; and trigger the at least one operation if the detected change in the passenger traffic system configured in the at least one building substantially differs from the detected changes in the passenger traffic systems configured in the similar buildings. The embodiment may enable taking into account abnormality of the change in triggering the at least one operation.

In an embodiment, in addition or alternatively, monitoring the changes comprises transforming the received data into timestamped origin-destination counts and using statistical analysis to detect changes in traffic behavior. The embodiment may enable monitoring passenger behavior in a building based on data received from equipment of a passenger traffic system.

According to a second aspect, there is provided a control system. The control system comprises the control device of a passenger traffic system of the first aspect; and at least one passenger traffic system configured to automatically send data gathered from equipment of the passenger traffic system to the control device. An embodiment may enable immediate and automatic reaction to changes in performance of one or more passenger traffic systems.

According to a third aspect, there is provided a method comprising receiving data from a passenger traffic system configured in at least one building, wherein the data comprises information associated with operations for transferring passengers of the passenger traffic system in the at least one building; based on the received data, monitoring a change in a quality of service level of the passenger traffic system in transferring the passengers and a change in a passenger traffic pattern in transferring the passengers in the passenger traffic system; and in response to detecting the change in the service level or in the passenger traffic pattern, running one or more simulations of the passenger traffic in the passenger traffic system in the at least one building using the received data in order to trigger at least one operation to change a configuration of the passenger traffic system. The embodiment may enable automatic detection and reaction to changes in performance of a passenger traffic system before nothing is broken or any customer complaints are received.

According to a fourth aspect, there is provided a computer program comprising program code which, when executed by at least one processing unit, causes the at least one processing unit to perform the method of the third aspect.

In an embodiment, the computer program is embodied on a computer readable medium.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

An embodiment provides a control device of a passenger traffic system, which may enable automatic performance monitoring of one or more passenger traffic systems configured in different buildings. The control device receives data from the one or more passenger traffic systems and may monitor performance changes of the passenger traffic systems based on the data. The monitored performance changes may be changes in a quality of service level in transferring passengers in the passenger traffic system or changes in passenger traffic patterns in transferring passengers in the passenger traffic systems. If the control device detects changes, a simulation is performed in order to trigger at least one operation to improve the monitored performance of the passenger traffic system.

The embodiment may enable automatic detection of cases affecting the performance level of a passenger traffic system when nothing is broken, but the service level may have dropped to an unacceptable level. The solution may use connectivity to obtain data from passenger traffic systems, the data comprising information from equipment of the passenger traffic systems, for example, to a cloud. In addition to typical device-level data of passenger traffic systems, additional data may be received to detect the service level and traffic patterns in the building. Hence, deterioration of performance of the passenger traffic system from the passenger point of view may be detected without manual intervention, such as a user complaint triggered investigation.

The solution may also provide continuously triggered follow-up and simulation-based analyses of the passenger traffic system, building traffic and performance in transferring passengers. This may enable immediate reaction for parameter tuning, maintenance or upgrading. Further, a customer may receive valuable information about changes in the usage of their building.

Figure 1:
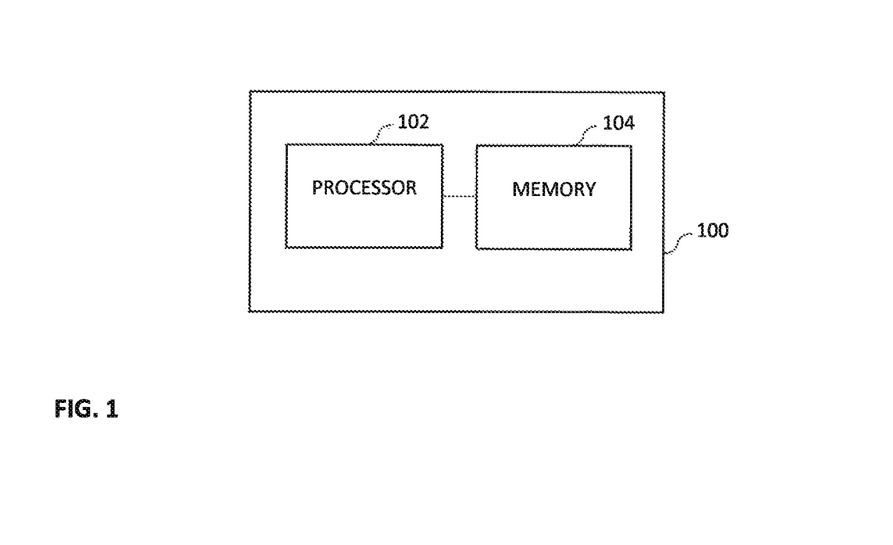
FIG. 1 illustrates a block diagram of a control device of a passenger traffic system according to an embodiment.

FIG. 1 illustrates a block diagram of a control device 100 of a passenger traffic system according to an embodiment. The control device 100 may be configured to automatically detect changes in performance of a passenger traffic system in a building.

The control device 100 may comprise at least one processing unit 102 and at least one memory 104. The control device 100 may be implemented as a cloud service. The at least one memory 104 comprises program instructions which, when executed on the at least one processing unit 102, cause the control device 100 to receive data from a passenger traffic system configured in at least one building. The data may be stored in the at least one memory 104. The received data comprises information associated with operations for transferring passengers of the passenger traffic system. The control device 100 is further configured to monitor a change in a quality of service level of the passenger traffic system in transferring the passengers and a change in passenger traffic pattern in transferring the passengers in the passenger traffic system based on the received data. In response to detecting the change in the service level or in the passenger traffic pattern, the control device 100 is configured to run one or more simulations of the passenger traffic in the passenger traffic system in the at least one building using the received data in order to trigger at least one operation to change a configuration of the passenger traffic system.

The control device 100 may be configured to monitor the changes, for example, using an automatic statistical analysis to detect deterioration of a performance of the passenger traffic system. The performance of the passenger traffic system, such as the service level, may be compared to a performance history of the particular building. In an embodiment, the detected change in the service level or in the passenger traffic pattern may be compared to detected changes in the service level or passenger traffic pattern in other passenger traffic systems of similar buildings. Similar buildings may be buildings with a same similar such or usage, as residential buildings or office buildings. Data may be received from a plurality of passenger traffic systems in different buildings worldwide and gathered to a cloud database by the control device 100.

The passenger traffic system may be an elevator system, an elevator group system or an escalator system. The data from the passenger traffic systems may be received from or via equipment comprising, for example, a control unit, a sensor and/or any other device of the passenger traffic system. The received may data comprise information on at least one of elevator movements, elevator calls, counts of passengers exiting an elevator, counts of passengers entering an elevator, origin-destination counts and observed equipment faults. The data associated with the equipment may pertain to behavior of the equipment, but also to behavior of the passengers and calls. For example, timestamped information about calls and passengers entering/exiting elevators may be used to measure waiting times and journey times as observed by the passengers.

The service level of the passenger traffic system may be associated to, for example, waiting times experienced by the passengers. The change in quality of the service level may comprise at least one of an increase in average waiting times, an increase in peak waiting times, an increase in journey times, changed origin-destination flows and no passengers using one or more sections of the passenger traffic system. The control device 100 may, for example, detect that the waiting times have dropped to an unacceptable level.

The change in the traffic pattern may comprise at least one of a change in origin-destination flows, the amount of traffic, floor populations and floor utilization. The detected change in the passenger traffic pattern may be taken into account in a control unit of the passenger traffic system, for example for a traffic forecaster, recognition of entrance floors, transfer floors and restaurants. In an embodiment, the detected change in the passenger traffic pattern may trigger an operation in order to adjust at least one parameter of the control unit of the passenger traffic system. As an example, the at least one parameter may be changed to increase a handling capacity of the passenger traffic system. The least at one adjusted parameter may comprise, for example, increased acceleration, speed or speeding up door times. On the other hand, if the change in the passenger traffic pattern shows decreased traffic, changes to make the service more convenient may be applied, such as setting a by-pass load lower. In an embodiment, the change in the passenger traffic pattern may trigger the control device 100 to send a notification to an administrator. As an example, a building manager may receive a notification stating: "in floor 6 at 3:00 pm usually heavy passenger traffic, check the reason and possible corrective actions".

In an embodiment, running simulations of the passenger traffic in the passenger traffic system in the at least one building may comprise using the received data and at least one adjusted parameter to find a parameter setup which provides improvement in the performance of the passenger traffic system compared to the monitored performance. The received data may be used in the one or more simulations to find out if the service level is optimal, or if it could be improved with a parameter change. In an embodiment, the simulations may be done continuously to monitor the performance of the passenger traffic system, such as the service level and the passenger traffic patterns. The adjusted parameters may comprise, for example, a change in at least one of parking floors, control parameters, drive parameters, advance door opening, walking speed and a location of the destination operating panel. The drive parameters may comprise, for example, increased speed, acceleration, and/or jerk. The embodiment may allow proactive automatic detection of service level problems and changes in the passenger traffic patterns, and search for possible solutions such as new control parameter settings, without requiring a customer complaint to trigger the process.

The control device 100 may be configured to automatically send a message to the passenger traffic system to change the parameter setup according to the simulation. Alternatively, the automatic performance monitoring device 100 may send a notification to an administrator of the passenger traffic system comprising a suggestion to manually change the parameter setup of the passenger traffic system according to the simulation result.

For example, based on the received data, the control device 100 may notice that in a certain elevator lobby, calls given from a particular destination operating panel (DOP) often to a situation where no passengers enter the assigned elevator car. A possible reason for this may be that the true walking times are longer than what is assumed by elevator group control. Thus, people do not make it to the elevator car in time. In response to the detected change, the control device 100 may increase a walking time parameter in the elevator group control to prevent this. Simulations may also be used to search for possible new locations for the DOP. After a while, the control device 100 may find a location that shows improved performance in simulations. An improvement opportunity notification may be sent to the building manager. The building manager may agree with the change, and the DOP is installed to the proposed optimal location closer to the elevators. The building manager may send an acknowledgement of the change to the control device 100. Thereafter, the control device 100 may obtain a new set of data and monitor the service level in the building to verify the predicted improvement.

As another example, a new cafeteria may be opened in floor 17. A building manager may receive a notification that the control device 100 has noticed a change in building usage by detecting a change in passenger traffic pattern. In response to the change in the passenger traffic pattern, the control device 100 may trigger simulations to search for possible improvements with the new traffic conditions. In this case, no improvement is found, and the actual service level is still good, so no further actions may be performed.

In some cases, like in the example above, the control device 100 may not find a parameter setup which provides improved performance. The control device 100 may run simulations of the passenger traffic in the building based on the received data, and use at least one equipment change to find an upgrade suggestion which provides improved service level compared to the monitored service level. Sometimes there may not be anything wrong with the equipment of the passenger traffic system, but a change of equipment may improve the performance of the system.

For example, the control device 100 may notice from the received data that an average time to destination in the building has increased due to increased traffic. A simulation-based search for improvements may be started in response to the detected service level change. This time, no change in the parameters would help, and the simulations may continue with trying various upgrades to the equipment. In the example, simulating the traffic with faster-speed doors shows improvement. This improvement may be suggested to an administrator of the building by sending a notification to the administrator. The notification may comprise the information of the detected change in the service level and the suggestion to improve the service level of the passenger traffic system by changing the doors. Thereafter, new better doors may be installed in the passenger traffic system of the building. The control device 100 may monitor the received data after the change to verify an improvement in the service level.

In an embodiment, the at least one operation may comprise sending a notification to an administrator of the passenger traffic system comprising information about at least one of the detected change, the changed parameter setup, a suggestion for changing a current parameter setup or a suggestion to upgrade the equipment. The notification comprising information of the detected change in the service level and/or the passenger traffic pattern may be sent immediately after detecting the change. In addition, or alternatively, the notification may be after sent an improvement opportunity has not been found based on the simulations. The notification may act as an alert to experts who may then attempt to find possible improvements manually.

In an embodiment, the control device 100 may be configured to receive an acknowledgement from the administrator that an action is performed in response to the received notification. In response to the received acknowledgement, the control device 100 may send a message to the passenger traffic system to cancel changing of the parameter setup. For example, the device 100 may automatically notice from the received data that in a residential building, people tend to avoid elevator B. In the example, while device-level data shows no signs of any physical malfunction, this avoidance indicates that something is wrong with elevator B. In response to the detected change, group control parameters of the elevator system may be immediately adjusted to prioritize other elevators, for example using a parameter setup found by running the simulations. Further, a notification about the detected change may be sent to the administrator by the control device 100. The administrator may inspect the elevator and notice that someone has left trash in the elevator and people are avoiding it due to smell. The administrator orders a cleanup. After the cleanup, the administrator may send an acknowledgement to the control device 100 that the elevator has been fixed. In response to the received acknowledgement, the control device 100 may send a message to the elevator system to cancel the group control parameter adjustment.

The control device 100 may be configured to verify that performance of the passenger traffic in system transferring passengers has improved by monitoring the performance based on a new set of received data after at least one of a parameter change or an equipment upgrade is performed in the passenger traffic system. The control device 100 may compare the monitored change to the earlier detected change to verify the improvement in the service level or in the passenger traffic pattern.

In an embodiment, the at least one operation comprises providing the detected change as an additional input for predictive maintenance. The input may act as an additional predictor for a predictive maintenance solution to detect faults. Hence, diagnostics may be improved. For example, a door in an elevator starts to malfunction. The device-level sensor data and fault information may not yet trigger a service need. However, a machine learning algorithm trained with both the device-level data and the received data to monitor the performance state may detect a likely failure. In response, the control device 100 may send a notification to an administrator. A maintenance person may be sent to the site based on the notification information to repair the door.

Figure 2:
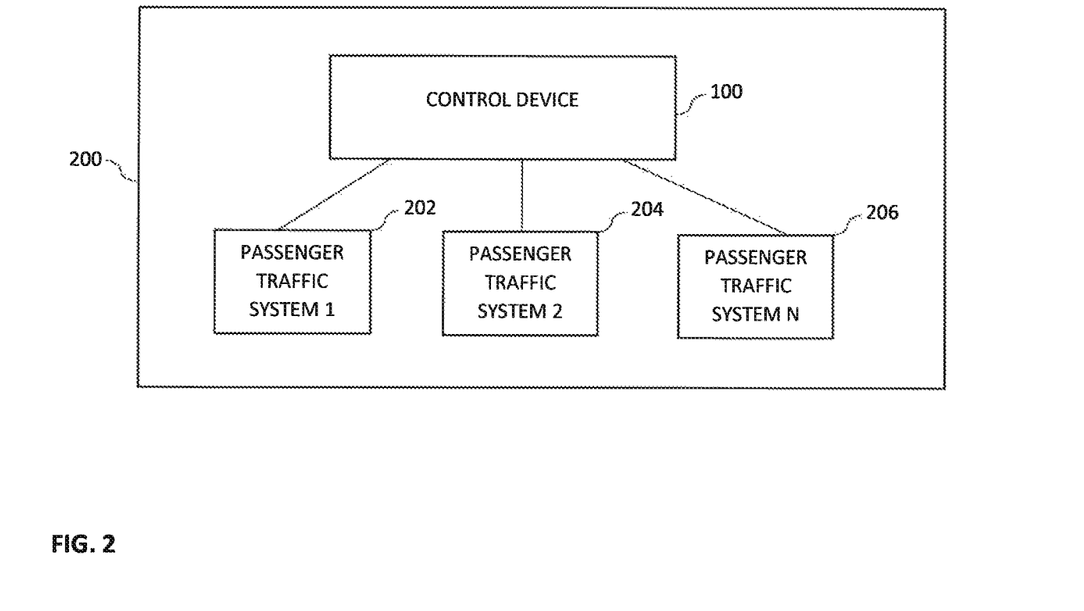
FIG. 2 illustrates a block diagram of a control system of a passenger traffic system according to an embodiment.

FIG. 2 illustrates a block diagram of a control system 200 according to an embodiment. The control system 200 comprises the control device 100 illustrated in FIG. 1, and at least one passenger traffic system 202, 204, 206 configured to automatically send data gathered from equipment of the passenger traffic system 202, 204, 206 to the control device 100.

The passenger traffic system 202, 204, 206 may be, for example, an elevator system or an escalator configured in a building. Each of the passenger traffic systems 202, 204, 206 may be configured in different buildings. The data may comprise information associated with performance of the passenger traffic systems 202, 204, 206 in transferring passengers. The at least one passenger traffic system 202, 204, 206 may send the data to the control device 100 at a predetermined interval, for example once an hour or once a day. The control device 100 may be coupled to the at least one passenger traffic system 202, 204, 206 wirelessly or via one or more data communication networks. The control device 100 may be implemented, for example, as a cloud service. The control system 200 may be able to react to issues in the at least one passenger traffic system 202, 204,

206 automatically without a need for manual inspections triggered, for example, only after a customer complaint.

Figure 3:
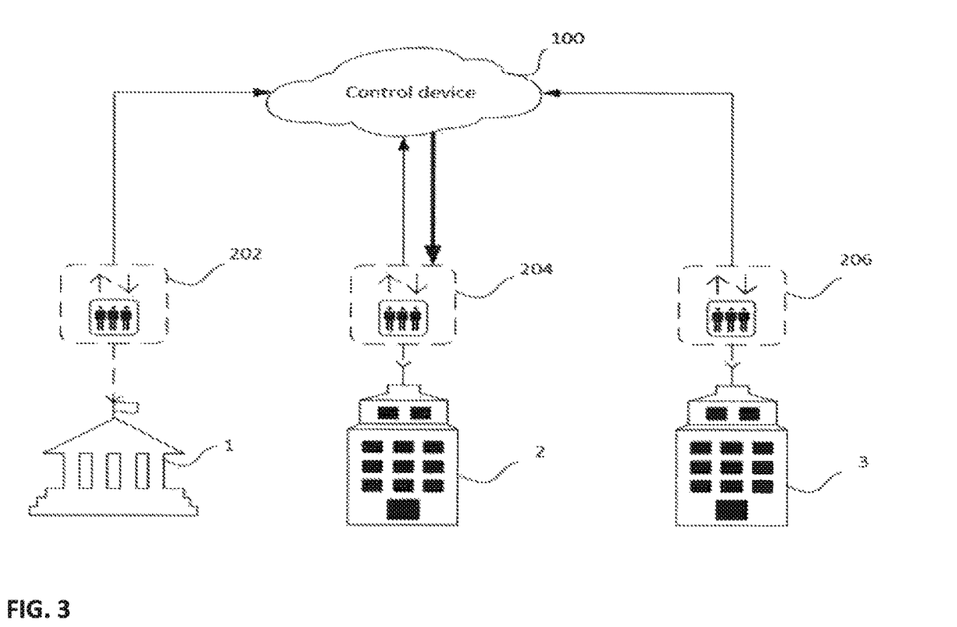
FIG. 3 illustrates an exemplary configuration of a control system of a passenger traffic system according to an embodiment.

FIG. 3 illustrates an exemplary configuration of a control system 200 according to an embodiment. The control system 200 may be configured to monitor performance of multiple passenger traffic systems 202, 204, 206 in different buildings.

The control system 200 comprises a control device 100 and a plurality of passenger traffic systems 202, 204, 206 in different buildings 1, 2, 3. The plurality of passenger traffic systems 202, 204, 206 are configured to send data to the control device 100, as illustrated with arrows towards the control device 100 in FIG. 3. The control device 100 may be configured to store the data in a memory, which may be implemented as a cloud database. The data may comprise information associated with operations for transferring passengers in the buildings 1, 2, 3. In FIG. 3, the buildings 2 and 3 may be similar buildings with a similar usage. For example, the building 1 may be a shopping center and the buildings 2 and 3 may be office buildings. In an embodiment, the control device 100 may be configured to compare the detected changes in the quality of service level and changes in the traffic patterns of passenger traffic systems 204, 206 in similar buildings 2, 3, and trigger the at least one operation if the detected change in the passenger traffic system 204, 206 configured in the at least one building 2, 3 substantially differs from the detected changes in the passenger traffic systems 204, 206 configured in the similar buildings 2, 3. In FIG. 3, the control device 100 may have detected a change in passenger traffic pattern in the passenger traffic system 204 configured in building 2, which change have substantially differed from possibly detected change in passenger traffic pattern of the other passenger traffic system 206 configured in the similar building 3. In response, the control device may trigger at least one operation to change a configuration of the passenger traffic system 204 as illustrated in FIG. 3 with a bolded arrow.

The data received and collected from different buildings, for example in the same city/country, may be used to detect special events that may impact traffic in multiple buildings. For example, if a morning peak is low in all office buildings, it is likely caused by a general event, for example a national holiday or an issue with public transportation. The detected change in the service level or passenger traffic pattern may trigger an operation comprising sending a notification to an administrator. The notification may comprise information that traffic population is lower than expected, but also that it seems to be due to an area-wide event. If the detected change was substantially different in one building compared to other buildings with similar usage, the control device 100 may run one or more simulations to improve the performance of the passenger traffic system configured in the building. As an example, because the data was received from multiple buildings and the detected change was not particular to the passenger traffic system 202, 204, 206 in one building, only a notification may be triggered. Alternatively, the control device 100 may not trigger any operation because the region-wide change in passenger traffic patterns may indicate that there is no need for an action. Further, the data received from a plurality of passenger traffic systems 202, 204, 206 configured in different buildings 1, 2, 3 may be used to learn, for example, country-specific performance to scale the triggered notifications accordingly. If the change is global in the area or building type, it can be expected that the change in traffic is also global, and not only applicable to the one building.

Figure 4:
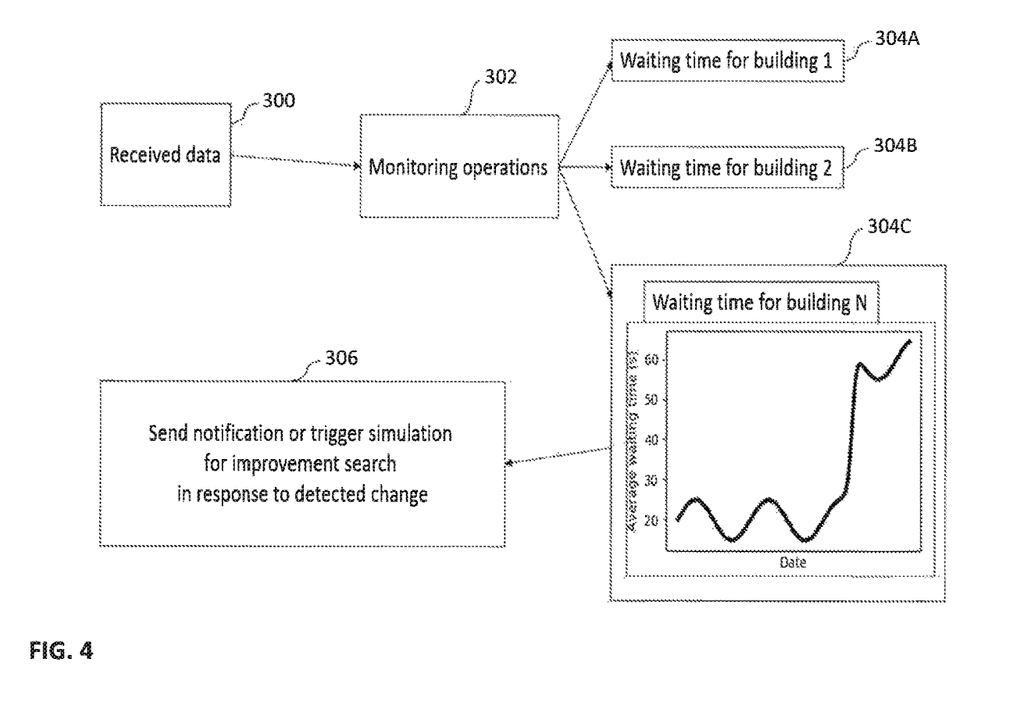
FIG. 4 illustrates a block diagram of an exemplary operation of a control device of a passenger traffic system according to an embodiment.

FIG. 4 illustrates a block diagram of an exemplary operation of a control device 100 of a passenger traffic system 202, 204, 206 according to an embodiment. The control device 100 may monitor performance of passenger traffic systems 202, 204, 206 configured in different buildings.

The control device 100 may have received data 300 from a plurality of passenger traffic systems 202, 204, 206 configured in different buildings 1 . . . . N. Based on the received data 300, the control device 100 may perform monitoring operations 302. For example, the control device 100 may monitor changes in a quality of service level and changes in passenger traffic patterns in transferring passengers of the passenger traffic systems 202, 204, 206. For example, a change in quality of service level may be detected based on deterioration in waiting times. In FIG. 4, the control device 100 may have calculated average passenger waiting times in each building 1 . . . . N 304A, 304B, 304C. For example, the control device 100 may notice from the received data 300 that waiting times 304C have increased in building N, and that this is likely caused by increased traffic. In response to the detected change, the control device 100 may run one or more simulations to trigger 306 at least one operation to change a configuration of the passenger traffic system 202, 204, 206 configured in the building N. For example, the control device 100 may send a notification to an administrator of the building N or trigger a simulation to find an improvement opportunity in order to improve the waiting times of passengers. For example, the control device 100 may attempt various changes in group control parameters such as weighting of the waiting time vs. time to distance in an objective function, and run simulations using the observed traffic of the building based on the received data as input. Finally, a parameter configuration that is predicted to improve the waiting times may be found. The group control parameters in the actual building N may be adjusted automatically in response to a message send by the control device 100. Optionally, a building manager may receive a notification of the adjustment. When the adjustment is in use, a new set of data received from the passenger traffic system may be used to verify the simulated prediction and an improvement compared to the earlier data. In an embodiment, the control device may compare the detected change in service level of each building to the detected service levels in similar buildings. If similar change was detected also in the similar buildings, the control device 100 may only send a notification to the building manager instead of for example making changes to control parameters because the change was not anomalous and likely caused by an area wide event.

In an embodiment, monitoring the changes may comprise transforming the received data into timestamped origin-destination counts and using statistical analysis to detect changes in traffic behavior. Changes in traffic behavior may be, for example, changes in usage times and amounts of traffic. To recognize that performance, such as passenger traffic patterns, of the passenger traffic system has changed, for example long term "traffic statistics" may be formed by e.g. exponential smoothing in a weekly cycle. For each day, a statistical hypothesis test may be used to test whether the daily traffic has changed to a significant degree. For example, if ten consecutive days are determined to be different, the control device 100 may interpret this as a permanent change. Other methods for detecting the changes are also possible, e.g. using data from multiple buildings or countries, and using modern mathematical methods, such as artificial intelligence or machine learning.

Figure 5:
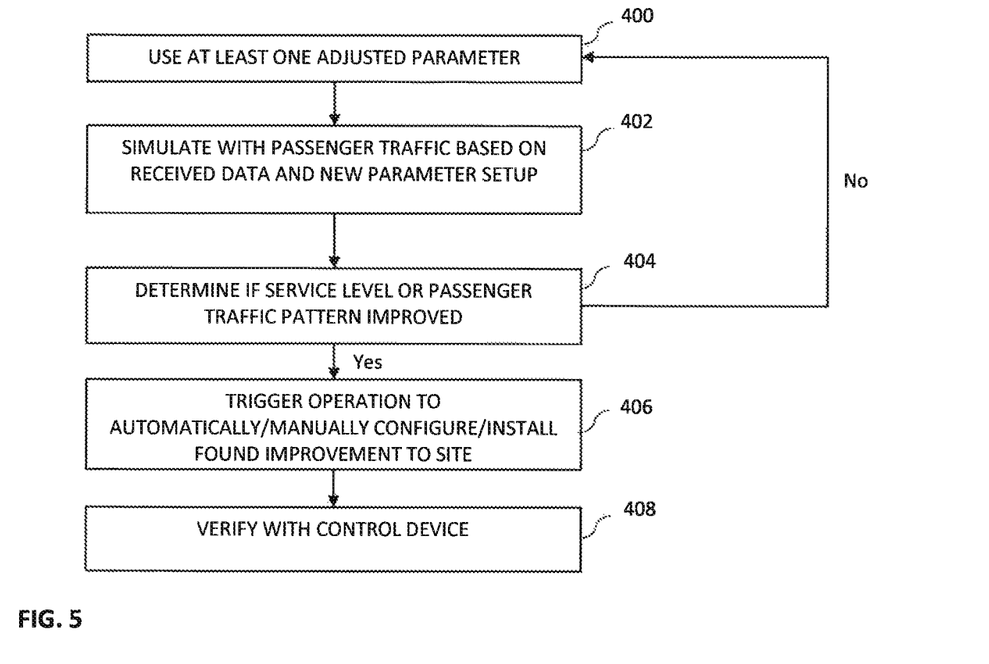
FIG. 5 illustrates a flow chart of a method for monitoring a passenger traffic system according to an embodiment.

FIG. 5 illustrates a flow chart of running simulations of passenger traffic of a passenger traffic system 202, 204, 206 according to an embodiment.

For example, the control device 100 may have detected a change in a service level in building N comprising a passenger traffic system 202, 204, 206, and triggered simulations for improvement search as illustrated in FIG. 4. The control device 100 may be configured to use at least one adjusted parameter at operation 400 to find a candidate parameter change for an improvement. The control device 100 may, for example, change a drive parameter of the passenger traffic system 202, 204, 206. At operation 402, the control device 100 may be then configured to simulate the passenger traffic in the building N based on the received data and the new parameter setup comprising the candidate parameter change. The received data may be stored in the control device 100 for use in simulations. The control device 100 may also store a database comprising parameters of the passenger traffic system 202, 204, 206 and the building in which the passenger traffic system 202, 204, 206 is configured in. Based on the simulation at operation 402, the control device 100 may determine at operation 404 if the service level or the passenger traffic pattern improved in the building N in response to the parameter change. The control device 100 may, for example, compute KPIs (key performance indicators) for the performance in the simulation and compare the results to the KPIs computed from the real data. If the service level or the passenger traffic patterns improved substantially, the control device 100 may automatically trigger at operation 406 at least one operation to change a configuration of the passenger traffic system 202, 204, 206. send a message to the passenger traffic system 202, 204, 206 configured in the building N to change the parameter setup according to the simulation. In an embodiment, the control device 100 may be configured to send a notification to an administrator of the building N to manually configure the improved parameter setup. In an embodiment, the control device 100 may run the simulations using at least one equipment change to search for the improvement. In response to finding a potential equipment upgrade opportunity based on the simulations, the control device 100 may send a notification to the administrator and suggest installing the found equipment for improved performance. After the configuration, the control device 100 may verify at operation 408 that the made parameter setup change actually improved the performance of the passenger traffic system 202, 204, 206 for transferring passengers. The control device 100 may be configured to receive a new set of data from the passenger traffic system 202, 204, 206, monitor a change in the service level or the passenger traffic pattern, and compare the recent monitored change to the earlier detected change to verify the improvement. For example, if the control device 100 monitored the change in waiting times for building N as illustrated in FIG. 4, the control device 100 may now detect based on the new set of data that the waiting times have returned to an acceptable level in response to the parameter setup change. In an embodiment, the control device 100 run may the simulations using at least one equipment change to search for the improvement. In response to finding a potential equipment upgrade opportunity based on the simulations, the control device 100 may send a notification to the administrator and suggest installing the found equipment for improved performance.

Figure 6:
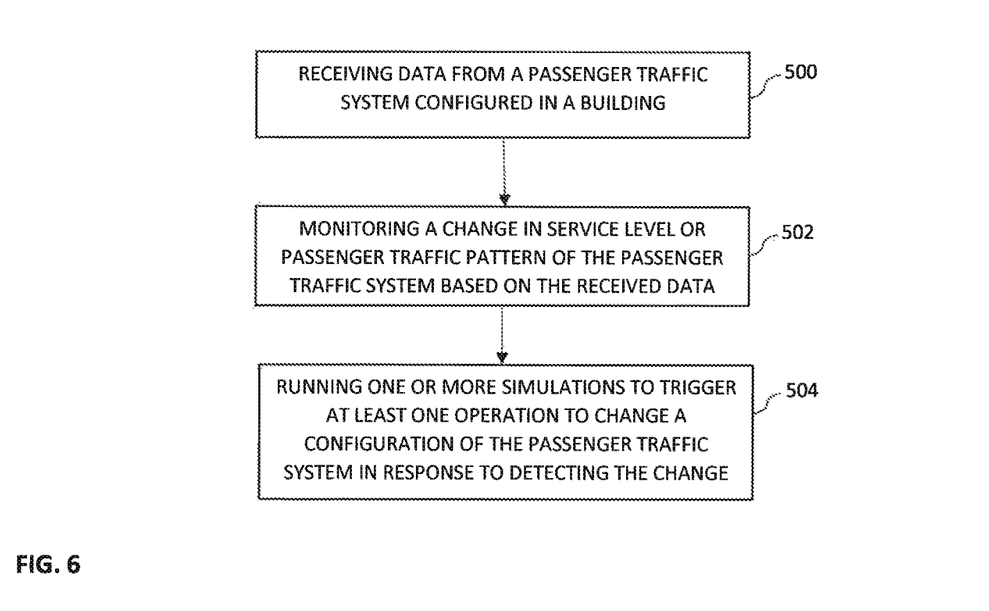
FIG. 6 illustrates a flow chart of a method for running simulations of passenger traffic in a passenger traffic system according to an embodiment.

FIG. 6 illustrates a flow diagram of a method for monitoring a passenger traffic system 202, 24, 206. The control device 100 may be configured to perform the method, and it may be implemented, for example, as a cloud service.

At operation 500, data is received from a passenger traffic system 202, 204, 206 in a building, the data comprising information associated with transferring passengers of the passenger traffic system 202, 204, 206. The data may be received at predetermined intervals, such as once a day. In an embodiment, the data may be received from a plurality of passenger traffic systems 202, 204, 206 configured in different buildings. The received data may comprise information on at least one of elevator movements, elevator calls, counts of passengers exiting an elevator, counts of passengers entering the elevator, origin-destination counts and observed equipment faults.

At operation 502, a change in a quality of service level of the passenger traffic system 202, 204, 206 in transferring the passengers and in passenger traffic pattern in transferring the passengers in the passenger traffic system 202, 204, 206 is monitored based on the received data. Monitoring the changes may comprise, for example, transforming the obtained data into timestamped origin-destination counts and using statistical analysis to detect changes in traffic behavior.

At operation 504, in response to detecting the change in t service level of in the passenger traffic pattern, one or more simulations of the passenger traffic in the passenger traffic system 202, 204, 206 configured in the at least one building is run using the received data in order to trigger at least one operation to change a configuration of the passenger traffic system 202, 204, 206. If the data is received from the plurality of passenger traffic systems 202, 204, 206 in different buildings, the detected changes in service level or passenger traffic pattern of passenger traffic systems 202, 204, 206 in similar buildings may be compared, and the at least one operation may be triggered if the detected change substantially differs in one passenger traffic system 202, 204 206 from the other passenger traffic systems 202, 204, 206.

In an embodiment, the change in the quality of service level may comprise at least one of an increase in average waiting times, an increase in peak waiting times, an increase in journey times, changed origin-destination flows and no passengers using one or more sections of the passenger traffic system 202, 204, 206. The change in a passenger traffic pattern may comprise at least one of a change in origin-destination flows, the amount of traffic, floor populations and floor utilization.

In an embodiment, the at least one operation may comprise running simulations of passenger traffic in the building using the received data and at least one adjusted parameter to find a parameter setup which provides an improved service level or passenger traffic pattern compared to the monitored service level or passenger traffic pattern. The at least one adjusted parameter may comprise a change in at least one of parking floors, control parameters, drive parameters, advance door opening, walking speed and a location of the destination operating panel. After the suitable parameter setup is found based on the simulations, a message may be automatically sent to the passenger traffic system 202, 204, 206 to change the parameter setup according to the simulation. Further, running the simulations may comprise using various equipment changes to find an equipment upgrade suggestion which provides an improved service level or passenger traffic pattern compared to the monitored service level or passenger traffic pattern.

In an embodiment, the at least one operation comprises sending a notification to an administrator of the passenger traffic system 202, 204, 206 comprising information about at least one of the detected change in the service level or the passenger traffic pattern, the changed parameter setup, a suggestion for changing a current parameter setup or a suggestion to upgrade the equipment. The method may further comprise receiving an acknowledgement from the administrator that an action is performed in response to the received notification, and sending a message to the passenger traffic system 202, 204, 206 to cancel changing of the parameter setup. The at least one operation may comprise, in addition or alternatively, providing the detected performance state change as an additional input for predictive maintenance.

In an embodiment, the method comprises verifying an improvement in the service level or in the passenger traffic pattern by monitoring a change in the service level or in the passenger traffic pattern in response to the triggered at least one operation to the configuration of the passenger traffic system 202, 204, 206, and comparing the recent monitored change to the earlier detected change.

The exemplary embodiments and aspects of the invention can be included within any suitable device, for example including servers, workstations, capable of performing the processes of the exemplary embodiments. The exemplary embodiments may also store information relating to various processes described herein.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments can be implemented by the preparation of application-specific integrated circuits or by interconnecting an appropriate network of conventional component circuits, as will be appreciated by those skilled in the electrical art(s). Thus, the examples are not limited to any specific combination of hardware and/or software. Stored on any one or on a combination of computer readable media, the examples n include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like.

As stated the components of the example embodiments may include a computer readable medium or memories for holding instructions programmed according to the teachings and for holding data structures, tables, records, and/or other data described herein. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates the that disclosed aspects/embodiments may consist of any such individual feature or combination of features. In view of the foregoing description it will be evident to a person skilled in the art that various modifications may be made within the scope of the disclosure.

The invention claimed is:

1. A control device of a passenger traffic system, configured to:
   receive data from the passenger traffic system configured in at least one building, wherein the data comprises information associated with operations for transferring passengers of the passenger traffic system in the at least one building;

based on the received data, monitor a change in a quality of service level of the passenger traffic system in transferring the passengers and a change in a passenger traffic pattern in transferring the passengers in the passenger traffic system; and in response to detecting the change in the service level or in the passenger traffic pattern, run one or more simulations of the passenger traffic in the passenger traffic system in the at least one building using the received data in order to trigger at least one operation to change a configuration of the passenger traffic system, wherein the one or more simulations of the passenger traffic in the passenger traffic system comprises using at least one adjusted parameter to find an improved parameter setup to change the configuration of the passenger traffic system, and wherein the one or more simulations comprises using at least one equipment change to find an equipment upgrade suggestion to change the configuration of the passenger traffic system.

2. The control device of claim 1, wherein the information associated with the operations for transferring passengers of the passenger traffic system comprises information on at least one of elevator movements, elevator calls, counts of passengers exiting an elevator, counts of passengers entering the elevator, origin-destination counts and observed equipment faults.

3. The control device of claim 2, wherein the change in the quality of service level comprises at least one of an increase in average waiting times, an increase in peak waiting times, an increase in journey times, changed origin-destination flows and no passengers using one or more sections of the passenger traffic system.

4. The control device of claim 1, wherein the change in a passenger traffic pattern comprises at least one of a change in origin-destination flows, the amount of traffic, floor populations and floor utilization.

5. The control device of claim 1, wherein the change in the quality of service level comprises at least one of an increase in average waiting times, an increase in peak waiting times, an increase in journey times, changed origin-destination flows and no passengers using one or more sections of the passenger traffic system.

6. The control device of claim 5, wherein the change in a passenger traffic pattern comprises at least one of a change in origin-destination flows, the amount of traffic, floor populations and floor utilization.

7. The control device of claim 2, wherein the change in a passenger traffic pattern comprises at least one of a change in origin-destination flows, the amount of traffic, floor populations and floor utilization.

8. The control device of claim 1, wherein the at least one adjusted parameter comprises a change in at least one of parking floors, control parameters, drive parameters, advance door opening, walking speed and a location of the destination operating panel.

9. The control device of claim 1, further configured to change the configuration of the passenger traffic system by sending a message to the passenger traffic system to change the parameter setup according to the simulation.

10. The control device of claim 9, further configured to:
monitor a change in the service level or the passenger traffic pattern in the passenger traffic system in response to the triggered at least one operation to change the configuration of the passenger traffic system; and compare the monitored change to the earlier detected change to verify an improvement in the service level or in the passenger traffic pattern.

11. The control device of claim 1, wherein the at least one operation comprises sending a notification to an administrator of the passenger traffic system, the notification comprising information about at least one of the detected change in the service level or the passenger traffic pattern, the changed parameter setup, a suggestion for changing a current parameter setup or a suggestion to upgrade the equipment.

12. The control device of claim 11, further configured to:
receive an acknowledgement from the administrator that an action is performed in response to the received notification; and send a message to the passenger traffic system to cancel changing of the parameter setup.

13. The control device of claim 1, wherein the at least one operation comprises providing the detected change as an additional input for predictive maintenance.

14. The control device of claim 1, wherein monitoring the changes comprises transforming the received data into time-stamped origin-destination counts and using statistical analysis to detect changes in traffic behavior.

15. A control system, comprising:
the control device of claim 1; and
at least one passenger traffic system configured to automatically send data gathered from equipment of the passenger traffic system to the control device.

16. A control device of a passenger traffic system, configured to:
receive data from the passenger traffic system configured in at least one building, wherein the data comprises information associated with operations for transferring passengers of the passenger traffic system in the at least one building;

based on the received data, monitor a change in a quality of service level of the passenger traffic system in transferring the passengers and a change in a passenger traffic pattern in transferring the passengers in the passenger traffic system;

in response to detecting the change in the service level or in the passenger traffic pattern, run one or more simulations of the passenger traffic in the passenger traffic system in the at least one building using the received data in order to trigger at least one operation to change a configuration of the passenger traffic system;

receive data from a plurality of passenger traffic systems configured in different buildings;

compare detected changes in the quality of service level and passenger traffic patterns of passenger traffic systems in similar buildings; and trigger the at least one operation if the detected change in the passenger traffic system configured in the at least one building substantially differs from the detected changes in the passenger traffic systems configured in the similar buildings.

17. A method, comprising:
receiving data from a passenger traffic system configured in at least one building, wherein the data comprises information associated with operations for transferring passengers of the passenger traffic system in the at least one building;

based on the received data, monitoring a change in a quality of service level of the passenger traffic system in transferring the passengers and a change in a passenger traffic pattern in transferring the passengers in the passenger traffic system; and in response to detecting the change in the service level or in the passenger traffic pattern, running one or more simulations of the passenger traffic in the passenger traffic system in the at least one building using the received data in order to trigger at least one operation to change a configuration of the passenger traffic system, wherein the one or more simulations of the passenger traffic in the passenger traffic system comprises using at least one adjusted parameter to find an improved parameter setup to change the configuration of the passenger traffic system, and wherein the one or more simulations comprises using at least one equipment change to find an equipment upgrade suggestion to change the configuration of the passenger traffic system.

18. A non-transitory computer readable medium storing a computer program comprising program code which, when executed by at least one processing unit, causes the at least one processing unit to perform the method of claim 17.

* * * * *